United States Patent
Goertz et al.

[11] Patent Number: 5,998,519
[45] Date of Patent: Dec. 7, 1999

[54] HALOGEN FREE FLAME RETARDANT SHEETING

[75] Inventors: Henricus J. J. Goertz; Richerdes J. M. Hulskotte, both of Schinnen; Reinoldus J. M. Borggreve, Hulsberg, all of Netherlands

[73] Assignee: DSM N.V., Heerlen, Netherlands

[21] Appl. No.: 09/100,759

[22] Filed: Jun. 22, 1998

Related U.S. Application Data

[63] Continuation of application No. PCT/NL96/00493, Dec. 20, 1996.

[30] Foreign Application Priority Data

Dec. 22, 1995 [NL] Netherlands ............................ 1001978

[51] Int. Cl.⁶ ...................................................... C08K 5/34
[52] U.S. Cl. ........................................................ 524/100
[58] Field of Search ............................................... 524/100

[56] References Cited

U.S. PATENT DOCUMENTS

| | | | |
|---|---|---|---|
| 3,660,344 | 5/1972 | Dietrich et al. | 106/18.2 |
| 4,630,421 | 12/1986 | Diehl et al. | 52/408 |
| 5,218,058 | 6/1993 | Zeitler et al. | 525/453 |

FOREIGN PATENT DOCUMENTS

| | | |
|---|---|---|
| 167 714 | 1/1986 | European Pat. Off. . |
| 183 266 | 6/1986 | European Pat. Off. . |
| 399 272 | 11/1990 | European Pat. Off. . |
| 708 212 | 4/1996 | European Pat. Off. . |
| 23 48 838 | 4/1975 | Germany . |
| 2088668 | 3/1990 | Japan . |
| 4090337 | 3/1992 | Japan . |

*Primary Examiner*—Kriellion S. Morgan
*Attorney, Agent, or Firm*—Pillsbury Madison & Sutro LLP

[57] ABSTRACT

The invention relates to a plastic sheeting which is suitable, in particular, for application in the construction industry.

It is obtained by employing thermoplastic elastomers and has good humidity-regulating properties and water impermeability. Flame retardancy in accordance with DIN 4102 B2 is obtained by employing melamine, melamine compounds or melamine condensates in the thermoplastic elastomer composition for the sheeting.

15 Claims, No Drawings

HALOGEN FREE FLAME RETARDANT SHEETING

This application is a con't of International Application No. PCT/NL96/00439 filed Dec. 20, 1996.

The invention relates to flame retardant plastic sheeting especially for use in the construction industry. More specifically the invention relates to flame retardant plastic sheeting for use in the construction industry that is permeable for water vapour but forms a barrier for water. Sheeting having these properties is especially usefull as roofing or as a damp-proof course above for example wooden window and door frames and adjacent brickwork.

EP-A-167714 and JP-A-04-090337 disclose polyetheramide and polyesterester block copolymers as material for construction sheeting. The inventors have found that polyetherester block copolymers and polyurethanes have even better properties for use as sheeting on construction. However requirements are set with respect to flame retardant properties for these sheetings in the construction industry. A very specific requirement for construction sheeting is the DIN 4102 B2 classification. This involves a sheet being suspended vertically and a specified Bunsen burner having a flame length of 20 mm being directed, at an angle of 45 degrees, against the edge or the surface of the sheet. The flame is held against the sheet for 15 seconds, after which the burn time until the flame tip reaches a mark (150 mm above the flame application point) is measured. If this burn time is 20 seconds or longer (measured on 5 samples), the B2 classification is complied with.

Known flame retardants for use in construction sheeting are combinations of a halogenated organic compound with antimony oxide, as reported, for example, in EP-A-0109928. Quite apart from the drawbacks, corrosivity and potential toxicity, this combination proves unable, according to the invention, even at a high concentration in the sheeting, to conform with DIN 4102 B2. Other known flame retardants for sheeting are metal hydroxides, for example alumina trihydrate and magnesium hydroxide in high concentrations, 60–80 wt %, see U.S. Pat. No. 4,851,463. Owing to the high concentration required of these inorganic materials in the sheeting, the mechanical characteristics are significantly impaired, which means that the use thereof must be avoided.

As even higher requirements will emerge in the future with respect to toxicity and corrosiveness of the smoke and suppression of smoke generation the. object of the invention is a flame retardant construction sheeting fulfilling the requirements of DIN 4102 B2 and in which no flame retardants have been incorporated that generate toxic or corrosive gases in case of fire, the sheeting being produced from thermoplastic elastomers chosen from the group of polyurethanes, polyetheresters, polyetheramides and polyesteresters. More specifically the composition should be free from halogen containing compounds.

Very surprisingly the inventors have found that sheeting of the aforementioned thermoplastic elastomers containing from about 5 to about 30 wt. % of at least one compound chosen from the group of melamine, melamine condensates and melamine compounds do fulfill the requirements of DIN 4102 B2.

This finding is very surprising as JP-A-02-088668 discloses that melamine and melamine cyanurate are effective only in polyetherester and polyesterester block copolymer, if combined with a halogenated organic compound. In comparative experiment 14 of JP-A-02-088668 is shown that about 6% of melamine cyanurate has no observable effect on the flame retardancy of polyetherester block copolymer based on polytetramethylene terephthalate and polytetrahydrofuran.

Polyetherester block copolymers, polyetheramide block copolymers, polyesterester block copolymers and polyurethanes block copolymers are known thermoplastic elastomers and are in general all applicable as material for the sheeting of the invention. Preference is thereby given to materials having a Shore D Hardness of between about 30 and 65. Materials that have a too low hardness have generally less good processing characteristics into sheeting, owing to the relatively low crystallinity and crystallisation rate. At higher hardnesses, the bending strength and the water vapour permeability decrease unduly.

A comprehensive description of the above polymers and the production thereof can be found for instance in the appropriate Chapters of Encyclopedia of Polymer Science and Technology, Vol. 12, page 76–177 (1985) polyetheresters and polyesteresters, and Kunststoff Handbuch, Teil 7, Ed. G. Oertel, Hanser Verlag (1983) for polyurethanes.

The block copolymers are commercially available under different trade mark names. Pebax, for polyetheramide, Arnitel, Hytrel and Pelprene for polyether- and polyesterester block copolymers and Pellethane for polyurethane block copolymers. Depending upon the desired mix of characteristics those skilled in the art will be able to choose the most appropriate thermoplastic elastomer. The sheeting according to the invention may further contain the usual additives, for example stabilizers, dyes or pigments, fillers, processing aids etc.

The content of melamine, melamine compound or melamine condensation product in the thermoplastic elastomer is between 5 and 30 wt %, based on the thermoplastic elastomer. Preferably, the content is between 7 and 25 wt %, more preferably between 9 and 22 wt %. The content is primarily determined by the desired level of flame retardancy and depends, inter alia, on the thickness of the sheet and the presence or absence of backing.

The particle size of the flame-retarding compound is preferably chosen to be as small as possible, preferably <50 $\mu$m, more preferably <20 $\mu$m. The best results are achieved with a particle size of <10 $\mu$m.

In the case of very thin films for instance <50 $\mu$m a content of <5 wt % may already suffice to fulfill the DIN 4102 B2 requirement. However reinforcing backing and/or additives adversely effect the flame retardancy so that higher contents i.e. >5 wt % are preferred.

If required, it is additionally possible to use, in the composition of the flame-resistant sheeting according to the invention, a minor amount of a compound which enhances the flame-retarding effect. Such a compound is chosen from the group of compounds which, in the event of a fire, do not produce corrosive and/or toxic gases. Examples of such compounds are polymers derived from aromatic compounds, for example novolaks and polyphenylene ethers, metal compounds, for example oxides, borates or oxalates, and organic phosphorus-containing compounds. Preferably, the content of these compounds which enhance the flame-retarding effect is smaller than 50 wt %, based on the melamine, the melamine compound or the melamine condensate. However it is experience of the inventors that under normal circumstances no enhancing second flame retarding compound is needed.

In general, melamine will be used only in the case of sheeting containing a thermoplastic elastomer having a low melting point, preferably in the order of 200° C. or less. In the case of higher melting points and concomittantly necessary higher processing temperatures it is possible for fouling of the processing equipment and "bleeding" of melamine to the surface of the sheeting to occur, as a result of the relatively high volatility of melamine. The use of melamine cyanurate and melam is therefore to be preferred.

The sheeting according to the invention is obtained by methods known per se from the thermoplastic elastomer. The thermoplastic elastomer is generally obtained by melt blending of the thermoplastic elastomer with the melamine, melamine cyanurate or melamine condensate and, if required, other additives, for example stabilizers. Said melt blending can take place in the customary melt blending equipment, the use of a blending extruder, preferably a twin-screw extruder, being preferable to obtain good dispersion of the flame retardant in the composition. Then the granules obtained after the blending extrusion step are processed in the customary film and sheet production equipment to give the sheeting of the desired thickness, use being made, in general, of sheet extrusion equipment.

The sheet may have any thickness required, for example between 20 $\mu$m and a few mm. Preferably the thickness of the sheet is less than 1 mm, more preferably less than 0.75 mm, most preferably less than 0.5 mm, to be effective as water-vapour permeable medium. The very thin sheeting is generally used in combination with one or more other porous supports which are to ensure the mechanical strength, such as described, for example, in JP-A-04-090337.

If required, the sheeting is used in combination with a fibrous material which is to ensure the required strength. Examples of such fibrous materials are organic fibres, for example polyester fibre or fibres of aromatic or aliphatic polyamides, and inorganic fibres, for example glass fibre. Said fibrous material may be present in the form of a woven or as a staple fibre web. The fibre-reinforced sheeting can be obtained, for example, by coextrusion of the woven or the staple fibre web with the thermoplastic elastomer, or by means of compression-moulding the fibre structure with the sheeting.

In addition the sheeting may contain various additives to improve the colour and the appearance.

The sheeting according to the invention can be used in highly diverse ways, for example as a component of a roof covering or as an underlay therefor, as protective sheeting above wooden subassemblies, for example door and window frames, as sheeting to drain away any rainwater or condensation water which has penetrated a cavity wall, as a seal between adjoining brickwork, as a wall covering, in which case the accompanying qualities such as elasticity and "soft touch" can be utilized in particular, and many other uses in the construction industry where the qualities of humidity control and water impermeability matter.

Although, for the time being, the main applications of the sheeting are to be found within the construction industry, applications outside this sector can also be indicated, for example in furniture upholstery, where good humidity regulation is one of the factors defining comfort and there are requirements regarding flame retardancy.

The invention is now explained in more detail with reference to the following examples, without, however, being limited thereto.

Materials Used

Arnitel EM 400®: from DSM, the Netherlands; a polyether-ester block copolymer containing polybutylene terephthalate as hard segments, and soft segments of polytetramethylene oxide, Shore D hardness =40.

Arnitel PM 380®: from DSM, the Netherlands; a polyether-ester block copolymer containing polybutylene terephthalate as hard segments, and soft segments of polypropylene oxide end-capped with ethylene oxide, Shore D hardness =38.

Pellethane® from BASF, Germany, a thermoplastic polyurethane block copolymer

Pebax® MV 1205 from Atochem, France, a polyetheramide block copolymer

Melamine: from DSM, particle size $d_{99}$<50 $\mu$m

Melamine cyanurate (Mecy): from DSM, aver. particle size 50%<2 $\mu$m

F-2400®: from Dead Sea Bromine, Israel, Br-epoxy polymer compound containing 52 wt % of Br, M=approx. 60,000.

$Sb_2O_3$: an 80 wt % masterbatch in PBT, from Campine.

Spinflam MF83®: from Himont, P- and N-containing intumescent flame retardant based on a piperazine salt.

CDP: from MFC, cresyl diphenyl phosphate

Chimasorb 944®: from Ciba Geigy, a UV stabilizer based on a hindered amine oligomer.

EXAMPLES I AND II, EXPERIMENTS A–E

Arnitel PM 380, after drying, was blended in a ZSK 30/33 D twin-screw extruder with the flame retardants listed in Table 1. Screw speed 200 rpm, throughput 10 kg/h, melt temperature 245° C. The granulate obtained was extruded, to produce a film having a thickness of 0.4 mm, on a Battenfeld 45 mm film extruder at a melt temperature of 216° C. and a roller temperature of about 20–25° C. and a rolling speed of 3.13 m/min.

The water vapour permeability, the water absorption after 3 days' immersion in water at 25° C., and flame retardancy according to DIN 4102 B2 of this film were determined.

The results of these tests are shown in Table 1.

+ means "meets the requirements for roofing sheeting". ++ means "amply meets the requirements for roofing sheeting". "N" is below standard.

EXAMPLE III

Example II is repeated, except that 50% of the melamine cyanurate is replaced by melamine. This composition likewise is found to meet DIN 4102 B2.

EXAMPLES IV AND V

Examples I and II were repeated, except that Arnitel EM 400 was used instead of Arnitel PM 380.

EXAMPLES VI, VII AND VIII

The compositions of Examples I and IV and V were additionally admixed with 0.5 wt % of Chimasorb 944 FL, and the stability of the sheeting when subjected to UV light was determined by means of an Atlas UVCON apparatus comprising a UV-B313 nm lamp with an exposure, each time, of 4 hours at 60° C., and 4 hours' condensation at 50° C. The breaking elongation of the film was determined by means of a Zwick 1445 instrument, drawing speed 50 mm/min, on an ISO 237 tension test bar ($L_0$=12 mm, $b_0$=2 mm). The results are reported in Table 2.

EXAMPLES IX AND X

Example II has been repeated, except Pellethane® and Pebax® MV 1205 were used instead of Arnitel® PM380. These compositions were flame extinguishing after 4 and 12 seconds respectively. Film thicknesses were 0.32 and 0.27 mm respectively.

TABLE 1

| | Exp. A | B | C | D | E | Ex. I | Ex. II | Ex. IV | Ex. V | Ex. IX | Ex. X |
|---|---|---|---|---|---|---|---|---|---|---|---|
| Arnitel PM 380 | 93*) | 86 | 78.75 | 85 | 95 | 100 | 90 | | | | |
| Arnitel EM 400 | | | | | | | | 100 | 90 | | |
| Pellethane | | | | | | | | | | 90 | |
| Pebax MV1205 | | | | | | | | | | | 90 |
| Mecy | | | | | | | 10 | | 10 | 10 | 10 |
| F-2400 | 5 | 10 | 15 | | | | | | | | |
| Sb$_2$O$_3$ | 2 | 4 | 6.25 | | | | | | | | |
| Spinflam MF 83 | | | | 15 | | | | | | | |
| CDP | | | | | 5 | | | | | | |
| water absorption [%] | | | | | | 1.9 | 1.7 | 0.75 | 0.70 | — | 120 |
| water vapour permeability | | | | | | ++ | ++ | + | + | ++ | ++ |
| DIN 4102 B2 | N | N | N | N | N | N | complies | N | complies | complies | complies |

*)composition in parts by weight

TABLE 2

| | | | | |
|---|---|---|---|---|
| Arnitel EM 400 | 100 | | 99.5 | 89.5 | |
| Arnitel PM 380 | | | | | 89.5 |
| Mecy | | | | 10 | 10 |
| 0.5 wt % of Chimasorb | | | 0.5 | 0.5 | 0.5 |
| Ageing *) [hours] | | 95 | >200 | >200 | 95 |

*) The measure chosen for ageing under UV light is the time until the breaking elongation has decreased to 250%.

What we claim is:

1. A flame retardant plastic sheeting suitable for use in the construction industry, and which is permeable for water vapor, consisting of at least one thermal plastic elastomer selected from the group consisting of polyurethane block copolymers, polyether amide block copolymers, polyether ester block copolymers, and polyester ester block copolymers, and containing from about 5 to 30 wt. %, based on the thermoplastic elastomer, of at least one compound selected from the group consisting of melamine condensates and melamine compounds.

2. A flame retardant plastic sheeting according to claim 1, wherein the thermoplastic elastomer has a Shore D hardness of between 30 and 65.

3. A flame retardant plastic sheeting according to claims 1 or 2, wherein the at least one compound is selected from melamine cyanurate and melam.

4. A flame retardant plastic sheeting according to claims 1 or 2, wherein the thermoplastic elastomer contains from about 7 to 25 wt. % of the at least one compound selected from the group consisting of melamine condensates and melamine compounds.

5. A flame retardant plastic sheeting according to claims 1 or 2, wherein the thermoplastic elastomer is a polyether ester block copolymer.

6. A flame retardant plastic sheeting according to claims 1 or 2, wherein the sheet has a thickness of between 20 μm and 2 mm.

7. A flame retardant plastic sheeting according to claim 6, wherein the thickness of the sheeting is less than 0.75 mm.

8. A flame retardant plastic sheeting suitable for use in the construction industry and which is permeable for water vapor consisting of at least one thermoplastic elastomer, having a Shore D hardness of between 30 and 65 selected from the group consisting of polyurethane block copolymers, polyether-amide block copolymers, polyether-ester block copolymers, and polyester-ester block copolymers; and containing from 9–22 wt. %, based on the thermoplastic elastomer, of at least one compound selected from the group consisting of melamine condensates, and melamine cyanurate, wherein said flame retardant plastic sheeting has a thickness of between 20 μm and 500 μm.

9. A flame retardant plastic sheeting according to claim 4, wherein the thermoplastic elastomer is a polyether ester block copolymer.

10. A flame retardant plastic sheeting according to claim 5, wherein the sheeting has a thickness of between 20 μm and 2 mm.

11. A flame retardant plastic sheeting according to claim 1, wherein the flame retardant plastic sheeting is obtained by melt blending the at least one thermoplastic elastomer with particles of the at least one compound, the particles being less than 50 μm.

12. A flame retardant sheeting according to claim 11, wherein the particles are less than 20 μm.

13. A flame retardant sheeting according to claim 12, wherein the particles have a particle size of less than 10 μm.

14. A flame retardant sheeting according to claim 1, wherein said at least one thermoplastic elastomer is selected from the group consisting of polyether-ester block copolymers and polyester-ester block copolymers.

15. A flame retardant plastic sheeting according to claim 14, wherein the plastic sheeting has a thickness of between 20 μm and 2 mm.

* * * * *